United States Patent
Matsushima et al.

(10) Patent No.: US 8,256,788 B2
(45) Date of Patent: Sep. 4, 2012

(54) FOOT REST FOR SADDLE-RIDE TYPE VEHICLE

(75) Inventors: Satoshi Matsushima, Wako (JP); Yusuke Inoue, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/235,724

(22) Filed: Sep. 19, 2011

(65) Prior Publication Data

US 2012/0074667 A1 Mar. 29, 2012

(30) Foreign Application Priority Data

Sep. 29, 2010 (JP) ................................. 2010-219673

(51) Int. Cl.
*B62J 25/00* (2006.01)
(52) U.S. Cl. ......................................................... 280/291
(58) Field of Classification Search .................. 280/291; 74/564; D12/125
See application file for complete search history.

(56) References Cited

U.S. PATENT DOCUMENTS

| | | | | |
|---|---|---|---|---|
| 26,337 A | * | 12/1859 | Sidwell | 102/524 |
| D257,249 S | * | 10/1980 | Kingsbury | D12/125 |
| D282,652 S | * | 2/1986 | Nista | D12/125 |
| 4,591,179 A | * | 5/1986 | Nakamura | 280/291 |
| 6,390,488 B1 | * | 5/2002 | Wallingsford | 280/291 |
| D488,407 S | * | 4/2004 | Wright | D12/125 |
| 7,946,193 B2 | * | 5/2011 | Smith | 74/564 |
| 2008/0179859 A1 | * | 7/2008 | Boehmke et al. | 280/291 |
| 2012/0091687 A1 | * | 4/2012 | Crain | 280/291 |

FOREIGN PATENT DOCUMENTS

JP 2009-292359 A 12/2009

* cited by examiner

*Primary Examiner* — Tony Winner
(74) *Attorney, Agent, or Firm* — Westerman, Hattori, Daniels & Adrian, LLP (57) ABSTRACT

Foot rests are provided for a saddle-ride type vehicle each including a step portion for placing a foot and an attachment portion which extends from the step portion toward a vehicle body frame and is turnably attached to a corresponding one of step brackets on the vehicle-body-frame side. The step portion includes: a first foot-placing portion, a second foot-placing portion, and a third foot-placing portion which extend in a vehicle width direction; a first reinforcement member and a second reinforcement member which connect the first foot-placing portion and the second foot placing portion; and a third reinforcement member and a fourth reinforcement member which connect the first foot-placing portion and the third foot-placing portion.

9 Claims, 12 Drawing Sheets

FOOT REST FOR SADDLE-RIDE TYPE VEHICLE

CROSS RELATED APPLICATIONS

This application claims the benefit of Japanese Patent Application No. 2010-219673, the contents of which are incorporated by reference.

TECHNICAL FIELD

The present disclosure relates to an improvement of a foot rest for a saddle-ride type vehicle.

BACKGROUND OF THE INVENTION

A saddle-ride type vehicle includes foot rests in a vehicle body on which a rider places his/her feet. Various types of foot rests for a saddle-ride type vehicle are proposed (for example, see Patent Document 1 (FIG. 4) Japanese Patent Application Publication No. 2009-292359.

As shown in FIG. 4 of Patent Document 1, a foot rest main body (22) (the number in parentheses indicates a reference numeral described in Patent Document 1. The same shall apply hereinafter) includes a foot-placing portion (26), and an attachment portion (27) formed integrally with the foot-placing portion (26) and attached to the vehicle body.

The foot-placing portion (26) includes a first foot-placing plate (26a) extending in a vehicle width direction, a second foot-placing plate (26b) disposed frontward of the first foot-placing plate (26a) and extending in the vehicle width direction, and a third foot-placing plate (26c) disposed rearward of the first foot-placing plate (26a) and extending in the vehicle width direction.

However, in the technique of Patent Document 1, the plate thicknesses of the first foot-placing plate (26a) to the third foot-placing plate (26c) are made large to secure a certain level of rigidity of the foot-placing portion (26). Such larger thicknesses of the members lead to an increase in the weight of the foot-placing portion (26).

A foot rest for a saddle-ride type vehicle is desired where a certain level of rigidity of a foot-placing portion is secured and an increase in weight thereof is suppressed.

SUMMARY OF THE INVENTION

An object of the present disclosure is to provide a foot rest for a saddle-ride type vehicle of which rigidity is secured and weight is reduced in a good balance.

A first aspect of the present disclosure provides a foot rest for a saddle-ride type vehicle including a step portion for placing a foot and an attachment portion which extends from the step portion toward a vehicle body frame and is turnably attached to a step bracket on the vehicle-body-frame side, characterized in that the step portion comprises: a first foot-placing portion which extends in a vehicle width direction, has a plate shape, and has saw-shaped pegs formed on an upper end thereof; a second foot-placing portion which is located frontward of the first foot-placing portion in the vehicle, extends in the vehicle width direction, has a plate shape, and has saw-shaped pegs formed on an upper end thereof; a third foot-placing portion which is located rearward of the first foot-placing portion in the vehicle, extends in the vehicle width direction, has a plate shape, and has saw-shaped pegs formed on an upper end thereof; at least one or more front portion reinforcement members connecting the first foot-placing portion and the second foot-placing portion; and at least one or more rear portion reinforcement members connecting the first foot-placing portion and the third foot-placing portion, the third foot-placing portion serves also as a stopper for a kick pedal, a connection portion where at least one of the rear portion reinforcement members is connected to the third foot-placing portion is located at a portion of the third foot-placing portion, which comes into contact with the kick pedal, and the third foot-placing portion is formed to be thicker than the first foot-placing portion.

A second aspect of the present disclosure is characterized in that the front portion reinforcement members connecting the first foot-placing portion and the second foot-placing portion include a first reinforcement, member and a second reinforcement member connecting the first foot-placing portion and the second foot-placing portion at a position outward of the first reinforcement member in the vehicle width direction, the rear portion reinforcement members include a third reinforcement member connecting the first foot-placing portion and the third foot-placing portion and a fourth reinforcement member connecting the first foot-placing portion and the third foot-placing portion at a position outward of the third reinforcement member in the vehicle width direction, the third reinforcement member and the fourth reinforcement member are disposed to be front-rear symmetric to the first reinforcement member and the second reinforcement member in a plan view of the vehicle with respect to the first foot-placing portion, the first reinforcement member and the second reinforcement member are each formed to have a length larger than a distance between the first foot-placing portion and the second foot-placing portion in a vehicle longitudinal direction, the third reinforcement member and the fourth reinforcement member are each formed to have a length larger than a distance between the first foot-placing portion and the third foot-placing portion in the vehicle longitudinal direction.

A third aspect of the present disclosure is characterized in that outer portions of the second foot-placing portion and the third foot-placing portion in the vehicle width direction in the plan view of the vehicle are connected to each other with an arc-shaped plate having a circular arc shape, and inner portions thereof in the vehicle width direction are connected to each other with a front-rear plate which has a straight shape or an arc shape and to which the attachment portion is attached, and the arc-shaped plate and the front-rear plate are connected to one end and the other end of the first foot-placing portion, respectively.

A fourth aspect of the present disclosure is characterized in that each of the first foot-placing portion, the second foot-placing portion, and the third foot-placing portion is formed such that a height thereof becomes smaller toward an outer side of the vehicle in a front view of the vehicle, and in a vicinity of a connection portion where the first foot-placing portion and the front-rear plate are connected, the first foot-placing portion is formed to have such a height dimension as to extend to a lower level than the second foot-placing portion and the third foot-placing portion.

A fifth aspect of the present disclosure is characterized in that a hole portion is opened in a base portion of the first foot-placing portion on an inner side in the vehicle width direction.

A sixth aspect of the present disclosure is characterized in that a plate thickness of each of the first foot-placing portion, the second foot-placing portion, and the third foot-placing portion becomes thinner toward the outer side in the vehicle width direction.

A seventh aspect of the present disclosure is characterized in that, on inner-side surfaces of the second foot-placing portion and the third foot-placing portion, a reinforcement rib is formed from the second foot-placing portion to the fourth reinforcement member extending to the third foot-placing portion such that the reinforcement rib passes through a connection portion with the first reinforcement member, a connection portion with the second reinforcement member, and a connection portion with the fourth reinforcement member.

An eighth aspect of the present disclosure is characterized in that an upper surface of the reinforcement rib is an inclined surface inclined with respect to a horizontal plane.

A ninth aspect of the present disclosure is characterized in that plate thicknesses of the first reinforcement member and the third reinforcement member are set to be larger than plate thicknesses of the second reinforcement member and the fourth reinforcement member, respectively.

According to the first aspect of the present disclosure, the third foot-placing portion serves also as the stopper of the kick pedal.

Since the connection portion where at least one of the rear portion reinforcement members is connected to the third foot-placing portion is located at the contact portion of the third foot-placing portion with the kick pedal, when a rider kicks the kick pedal, the kick pedal is brought into contact with the connection portion, and the third foot-placing portion serves as the stopper.

Moreover, the plate thickness of the third foot-placing portion is set to be larger than the plate thickness of the first foot-placing portion. When a rider kicks the kick pedal, the kick pedal is brought into contact with the third foot-placing portion of the step portion, and the third foot-placing portion serves as the stopper. In the present disclosure, since the plate thickness of the third foot-placing portion is larger than the first foot-placing portion, the rigidity of the third foot-placing portion is increased and the kick pedal can be surely stopped by the third foot-placing portion with increased rigidity.

According to the second aspect of the present disclosure, the first to fourth reinforcement members are disposed to be front-rear symmetric to each other in the plan view of the vehicle with respect to the first foot-placing portion. In addition, the first to fourth reinforcement members are each formed such that the length thereof is larger than the distance between the first foot-placing portion and the second foot-placing portion in a vehicle longitudinal direction and the distance between the first foot-placing portion and the third foot-placing portion in a vehicle longitudinal direction. In other words, the first to fourth reinforcement members are arranged in an X-shape in the plan view.

Depending on the riding posture of the rider, a stepping force in the vehicle width direction is sometimes applied only to the second foot-placing portion or the third foot-placing portion.

Conventionally, in a case where reinforcement members are provided in a step portion provided with first to third foot-placing portions extending in the vehicle width direction, first to fourth reinforcement members extend in the vehicle longitudinal direction from the first foot-placing portion. The first to fourth reinforcement members are arranged to form cross shapes with the first foot-placing portion.

When the stepping force in the vehicle width direction is applied only to the second foot-placing portion in the foot rest with the cross shapes, the second foot-placing portion may be shifted in the vehicle width direction with respect to the first foot-placing portion. To counter this, the first and the second reinforcement members require to be made thicker. This also applies to the third foot-placing portion, and thus the weight of the first to fourth reinforcement members is increased.

In the present disclosure, the first to fourth reinforcement members are arranged in an X-shape. Thus, the rigidity against an external force in the vehicle width direction is increased, and the first to fourth reinforcement members can be made thinner.

As a result, rigidity of the foot rest is secured and weight thereof is reduced in a good balance.

Moreover, making the first to fourth reinforcement members thin increases an opening area in the plan view. Since the area of opening portions formed between the foot-placing portions and the reinforcement members is increased, mud attached to the foot-placing portions can be immediately discharged.

According to the third aspect of the present disclosure, the outer portions of the second foot-placing portion and the third foot-placing portion in the vehicle width direction are connected to each other with the arc-shaped plate. Since an outer end of the step portion is formed of the arc-shaped plate, the area of the step portion can be increased compared to a case where the outer end is formed of a straight-shaped plate.

In addition, an outer frame of the step portion is formed of the second foot-placing portion, the arc-shaped plate, the third foot-placing portion, and the front-rear plate, and the first foot-placing portion and the first to fourth reinforcement members are attached in a leaf-vein shape in a portion surrounded by the outer frame.

Since the outer frame is reinforced by the first foot-placing portion and the first to fourth reinforcement members in the leaf-vein shape, sufficient rigidity is secured. Thus, the outer frame can withstand an impact from the surroundings to the foot-placing portions.

According to the fourth aspect of the present disclosure, each of the first foot-placing portion, the second foot-placing portion, and the third foot-placing portion is formed such that the height thereof becomes smaller toward the outer side of the vehicle in the front view of the vehicle.

Since the second foot-placing portion and the third foot-placing portion are made smaller than the first foot-placing portion, the foot placing-portion constituting the step portion can be reduced in weight. In addition, the first foot-placing portion is formed to have such a height dimension as to extend to a lower level than the second foot-placing portion and the third foot-placing portion. Thus, the rigidity against an impact in a height direction is secured.

According to the fifth aspect of the present disclosure, the hole portion is opened in the base portion of the first foot-placing portion, which is on the inner side in the vehicle width direction. Thus, the base portion of the first foot-placing portion can be made flexible and easier to deflect. By making the base portion of the first foot-placing portion easier to deflect, a force applied to the attachment portion can be distributed.

According to the sixth aspect of the present disclosure, the plate thickness of each of the first foot-placing portion, the second foot-placing portion, and the third foot-placing portion becomes smaller toward the outer side in the vehicle width direction. Since the plate thickness becomes smaller toward the outer side in the vehicle width direction, the root portion of the step portion can have sufficient rigidity while the step portion is reduced in weight.

According to the seventh aspect of the present disclosure, on the inner-side surfaces of the second foot-placing portion and the third foot-placing portion, the reinforcement rib is formed from the second foot-placing portion to the third foot-placing portion, up to the portion of the fourth reinforcement member extending to the third foot-placing portion. Such reinforcement rib allows the rigidities of the second foot-placing portion and the third foot-placing portion to be maintained at a high level while allowing the plate thicknesses to be reduced to achieve further weight reduction of the step portion.

According to the eighth aspect of the present disclosure, the upper surface of the reinforcement rib is the inclined surface. Such inclined surface allows mud attached to the foot-placing portions less likely to stay on the foot-placing portions.

According to the ninth aspect of the present disclosure, the plate thicknesses of the first reinforcement member and the third reinforcement member are set to be larger than the plate thicknesses of the second reinforcement member and the fourth reinforcement member, respectively. By making the first reinforcement member and the third reinforcement member located on the step-bracket side of the step portion thicker, the rigidity of the root portion of the step portion can he increased while the weight of the step portion is reduced.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment mode of the present disclosure is described below in detail. In an embodiment and the drawings, "up", "down", "front", "rear", "left", and "right" are determined based on a rider sitting on a motorcycle. Note that, the drawings are to be viewed in a direction in which reference numerals can be read properly.

An embodiment of the present disclosure is described based on the drawings.

Figure 1:
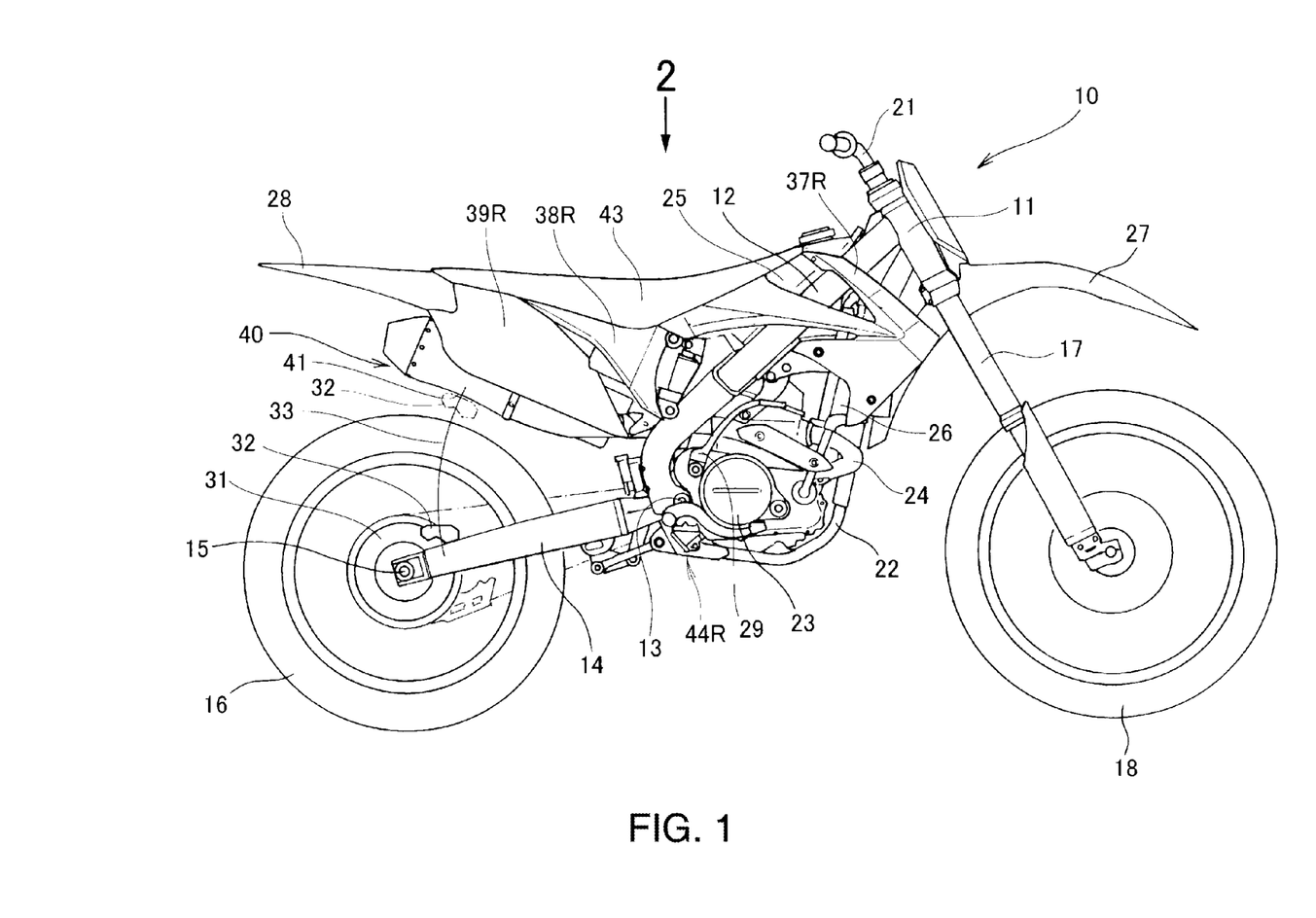
FIG. 1 is a right-side view of a motorcycle of the present disclosure.

As shown in FIG. 1, a motorcycle 10 is a saddle-ride type vehicle including, as main elements: a pair of right and left main frames 12 extending obliquely downward toward the rear of the vehicle from a head pipe 11; a swing arm 14 extending toward the rear of the vehicle from rear portions of the main frames 12 with a pivot shaft 13 therebetween; a rear wheel 16 rotatably attached to a rear portion of the swing arm 14 with an axle 15 therebetween; front forks 17 turnably (steerably) attached to the head pipe 11; a front wheel 18 rotatably attached to bottom portions of the front forks 17; a handlebar 21 attached to an upper end of the front forks 17 and used to steer the front wheel 18; a downtube 22 extending downward from a vicinity of the head pipe 11 and then toward the rear of the vehicle and connected to bottom ends of the rear portions of the main frames 12; an internal combustion engine 23 disposed between the downtube 22 and the main frames 12 thereabove; an exhaust pipe 24 extending toward the front of the vehicle from the internal combustion engine 23, then curving to run on the vehicle-width right side of the internal combustion engine 23, and running between the pair of main frames 12 to extend toward the rear of the vehicle; and a muffler 40 connected to a rear end of the exhaust pipe 24.

A vehicle-body frame 20 includes the head pipe 11, and the pair of right and left main frames 12 extending obliquely downward toward the rear of the vehicle from the head pipe 11.

The internal combustion engine 23 is preferably a gasoline engine, particularly a water-cooled four-stroke gasoline engine. A fuel tank 25 for the internal combustion engine 23 is supported by the main frames 12 at a position rearward of the head pipe 11 in the vehicle. A radiator 26 for the internal combustion engine 23 is disposed along the downtube 22.

A kick pedal 29 kicked by the rider in engine start is provided on a right side surface of the internal combustion engine 23.

In this saddle-ride type vehicle, a front fender 27 is disposed at a position sufficiently higher than the front wheel 18, and a rear fender 28 is disposed at a position sufficiently higher than the rear wheel 16.

A brake disk 31 is attached to the rear wheel 16, and is brought into a braking state by a brake caliper 32 provided on an upper surface of the swing arm 14.

Since the muffler 40 is disposed above the brake caliper 32, a moving path 33 of the brake caliper 32 moving about the pivot shaft 13 intersects the muffler 40. Accordingly, countermeasures to prevent the brake caliper 32 from coming into contact with the muffler 40 are required.

Thus, in this example, a bottom surface of the muffler 40 is locally recessed upward to form a recess portion 41 in which the brake caliper 32 can be housed.

If the bottom surface level of the muffler 40 is made higher to avoid interference with the brake caliper 32, the cross-section area of the muffler 40 is reduced and the noise reduction performance is reduced.

Moreover, if a protector is attached to the muffler 40 to prevent the brake caliper 32 from coming into contact with the muffler 40, a procurement cost and an attachment cost of the protector occur.

In the present disclosure, instead of raising the bottom surface level of the muffler 40, the recess portion 41 for housing the brake caliper 32 is provided in the muffler 40. Such recess portion 41 causes small reduction in the cross-section area of the muffler 40. In other words, interference with the brake caliper 32 is prevented while the noise reduction performance of the muffler 40 is maintained.

In addition, since no protector is required, increase in cost can be suppressed.

Figure 2:
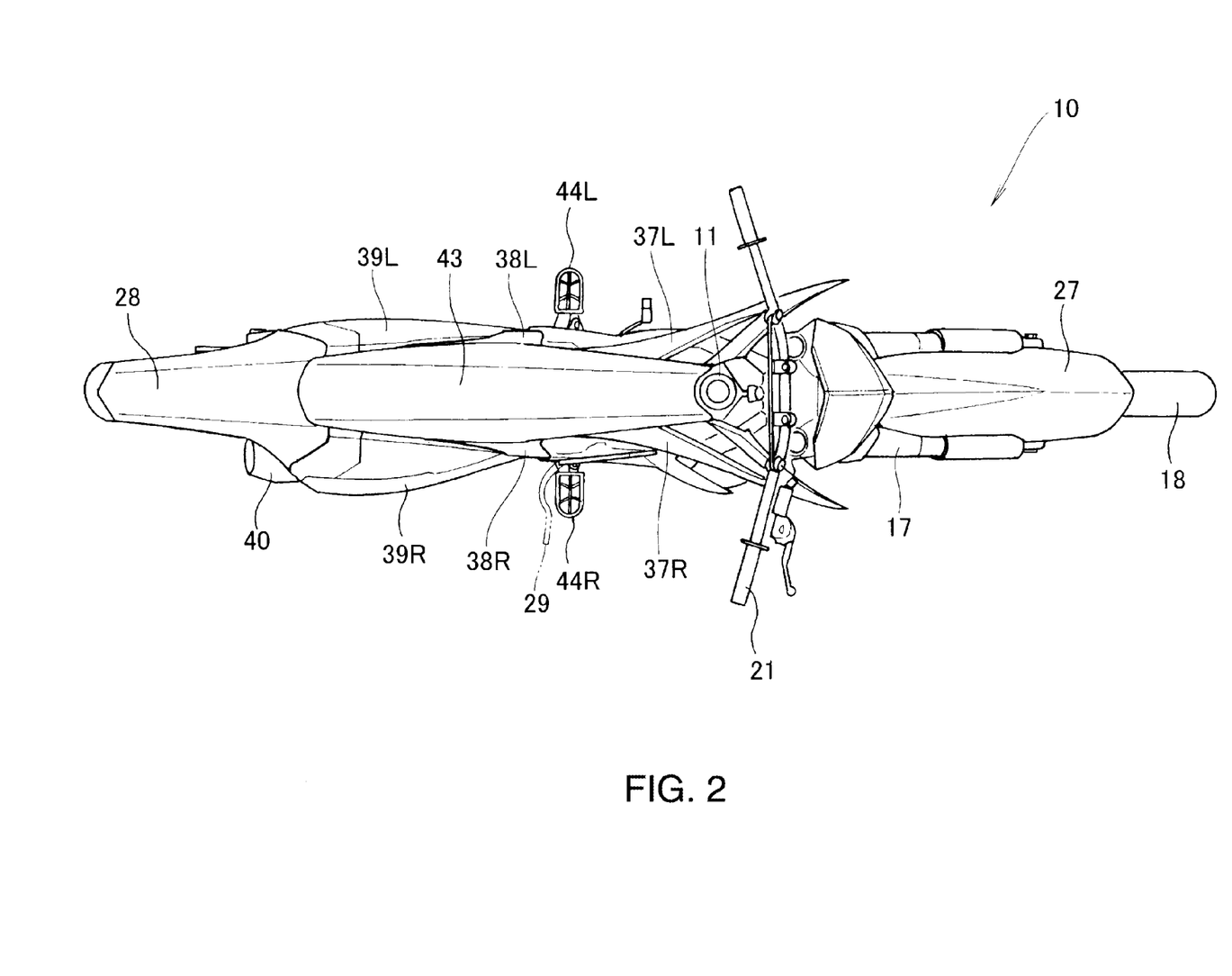
FIG. 2 is a view seen in a direction of arrow 2 in FIG. 1.

As shown in FIG. 2, a seat 43 is provided which extends toward the rear of the vehicle from a portion on the rear side of the head pipe 11. On the left and right sides of the seat 43 in the vehicle width direction, foot rests 44L, 44R for placing the feet of the rider are extended, respectively.

In the drawing, the kick pedal 29 illustrated in an imaginary line is in a state where the kick pedal 29 is folded outward in the vehicle width direction and is at a position kicked down by the rider to start the internal combustion engine 23.

Referring to FIG. 1 also, front-side cowls 37L, 37R are provided in lateral side portions of a front portion of the vehicle. Middle-side cowls 38L, 38R continuous with the front-side cowls 37L, 37R extend toward the rear of the vehicle. Rear-side cowls 39L, 39R continuous with the middle-side cowls 38L, 38R extend toward the rear of the vehicle.

Figure 3:
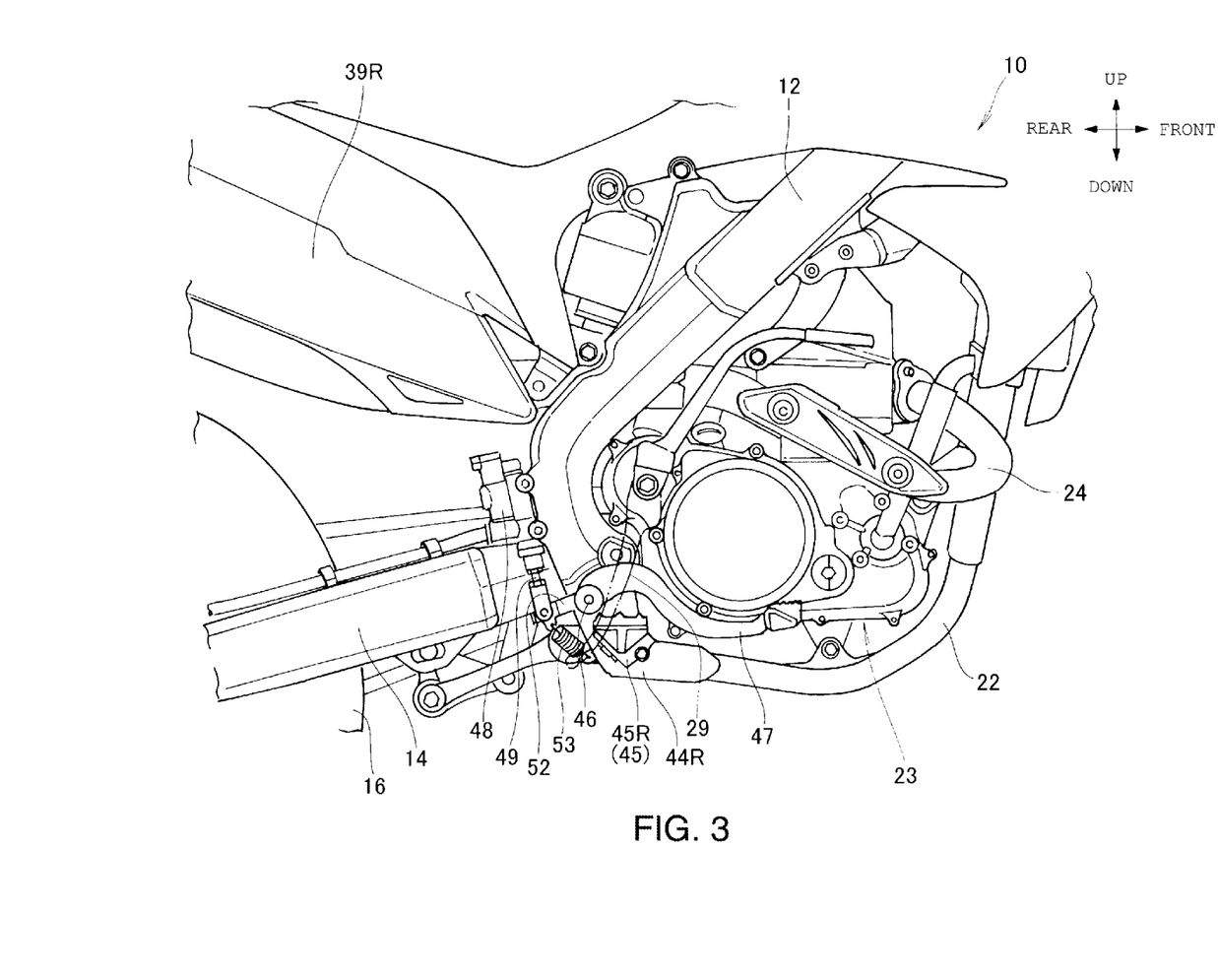
FIG. 3 is a right-side view of a main portion of the motorcycle.

As shown in FIG. 3, the left and right foot rests 44L, 44R (only the reference numeral 44R of the foot rest on the near side of the drawing is shown) extend outward in the vehicle-width direction from bottom portions of the main frames 12. The foot rests 44L, 44R are attached respectively to step brackets 45L, 45R (only the reference numeral 45R of the step bracket on the near side of the drawing is shown) on the vehicle-frame side.

A pedal supporting shaft 46 is provided to the main frame 12 at a position above the step bracket 45R. A brake pedal 47 is turnably provided to extend from the pedal supporting shaft 46 toward the front of the vehicle. A brake master cylinder 48 is attached to the main frame 12 at a position rearward of the brake pedal 47 in the vehicle. A rod 49 extending from the brake master cylinder 48 is connected to a link member 52 extending to the rear of the vehicle from a rear portion of the brake pedal 47. A spring 53 is provided between the link member 52 and the main frame 12, the spring 53 biasing the brake pedal 47 to return to its original position when no stepping force is applied to the brake pedal 47.

Note that, the kick pedal 29 illustrated in an imaginary line in the drawing is in a state where the kick pedal 29 is folded outward in the vehicle width direction and is at a position kicked down by the rider to start the internal combustion engine 23. An attachment relationship of the foot rest 44R is described in the next drawing.

Figure 4:
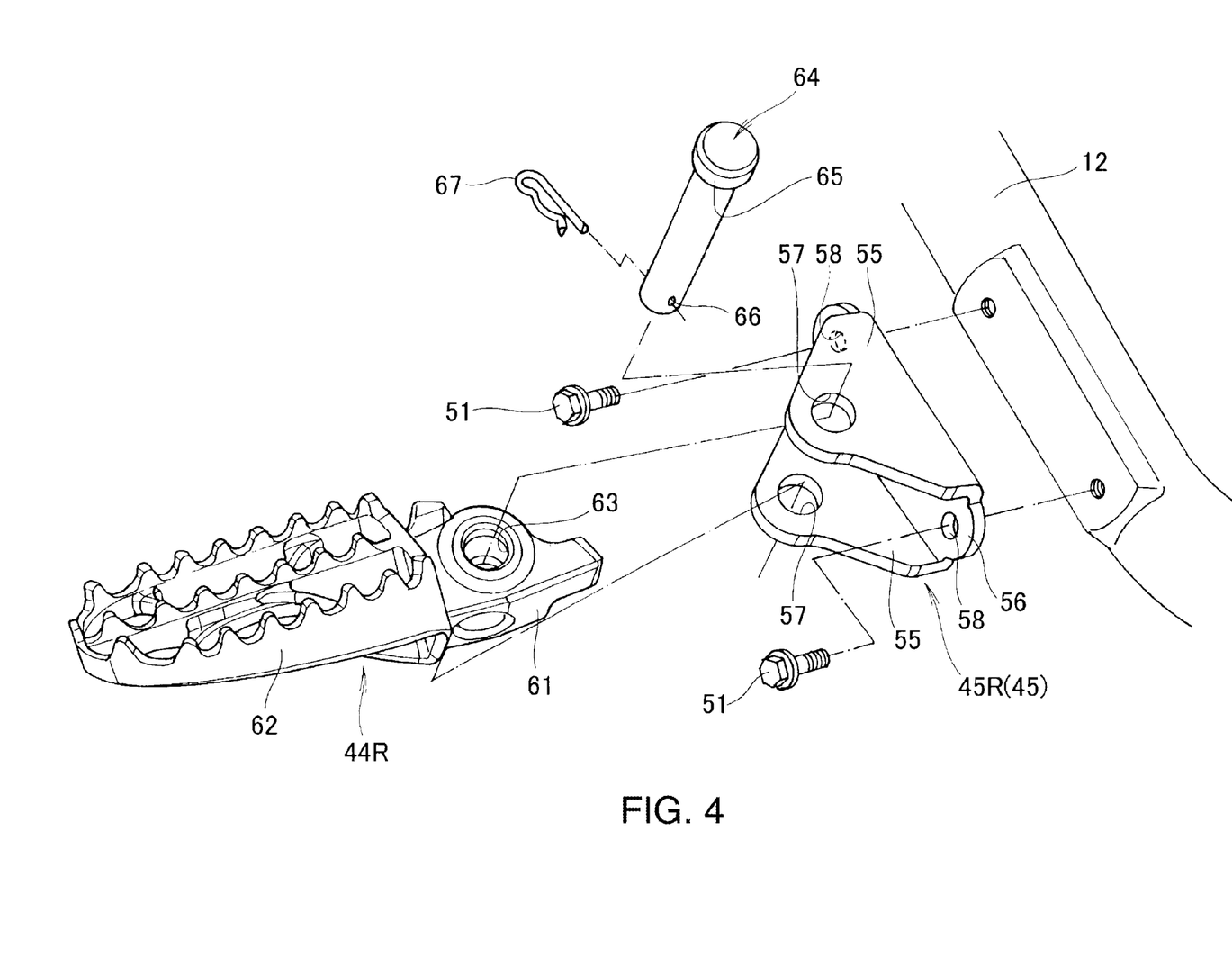
FIG. 4 is an exploded perspective view for explaining an attachment structure of a foot rest.

As shown in FIG. 4, the step bracket 45R is fastened to the main frame 12 being a component of the vehicle-body frame by fastening members 51, 51, and the foot rest 44R is turnably attached to the step bracket 45R. The step bracket 45R has a square-U-shaped cross section, and is formed of a pair of upper and lower flanges 55, 55 and a connecting portion 56 connecting end portions of the pair of upper and lower flanges 55, 55. Holes 57, 57 for fixing the foot rest 44R are opened respectively in the flanges 55, 55, and fastening holes 58, 58 into which the fastening members 51, 51 are inserted, respectively, are opened in the connecting portion 56.

The foot rest 44R is formed of an attachment portion 61 which is turnably attached to the step bracket 45R on the vehicle-frame side and a step portion 62 which extends outward from the attachment portion 61 in the vehicle width direction and on which the foot of the rider is placed. A hole 63 is opened in the attachment portion 61 at a position corresponding to the holes 57, 57 opened in the step bracket 45R. A shaft member 64 being a rotary shaft is attached by being inserted through the holes 57, 57 and the hole 63, and thus the foot rest 44R is turnably attached to the step bracket 45R. The shaft member 64 has a head portion 65 whose diameter is larger than a shaft diameter, and has a pin hole portion 66 at a bottom end portion thereof. A pin 67 for holding the shaft member 64 to the step bracket 45R is inserted through the pin hole portion 66.

The step bracket 45R on the right side has been described so far. The step bracket 45L on the left side has a similar structure except that the step bracket 45L and the step bracket 45R on the right side are left-right symmetric with respect to the center line in the vehicle width direction, and thus descriptions thereof are omitted.

Hereinbelow, in FIGS. 5 to 9, detailed structures of the step portion constituting a main portion of the foot rest are described.

Figure 5:
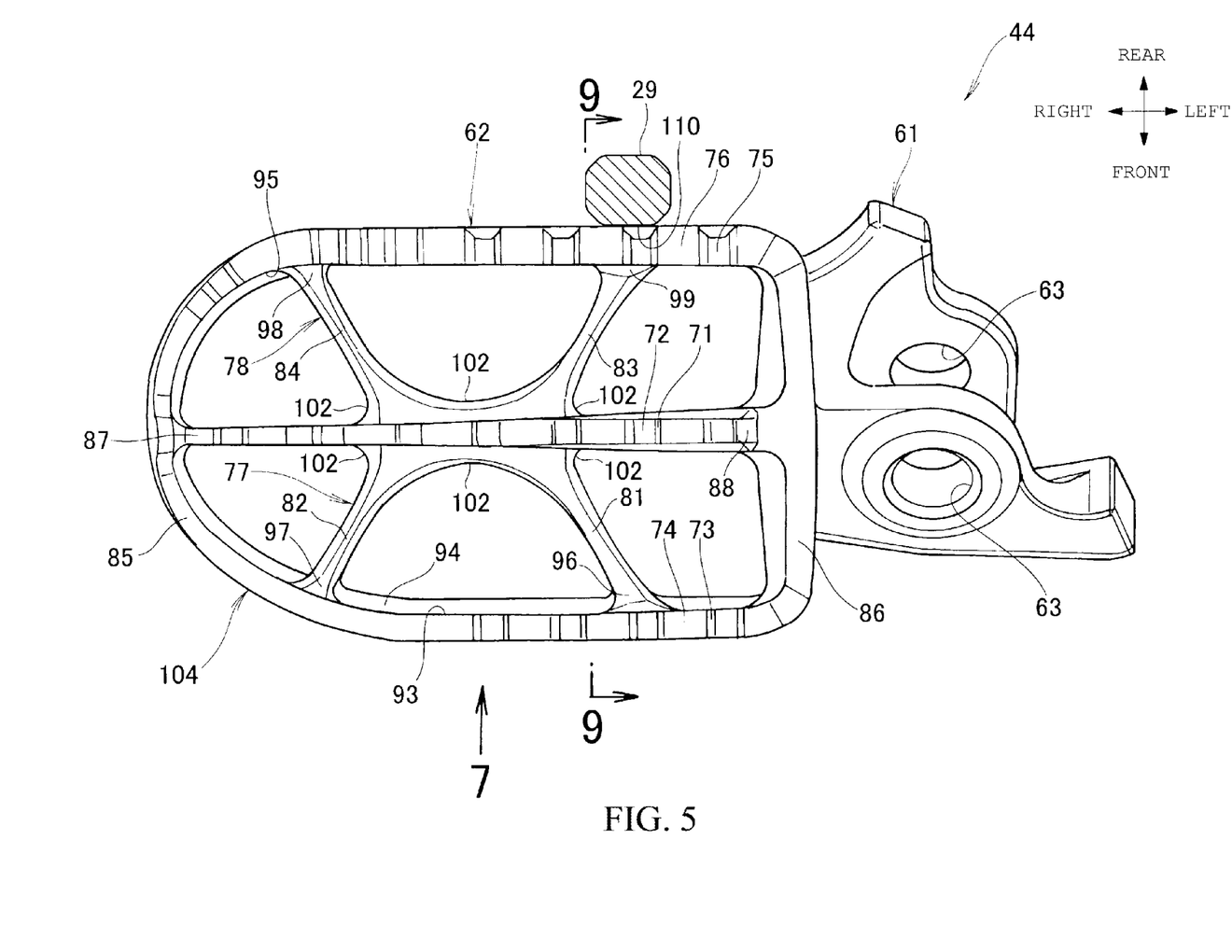
FIG. 5 is a plan view (view seen from above the vehicle) of the foot rest.

First, a structure of a foot rest seen from above the vehicle is described.

As shown in FIG. 5, the step portion 62 is formed of: a first foot-placing portion 72 which extends in the vehicle width direction, has a plate shape, and has saw-shaped pegs 71 formed in its upper end; a second foot-placing portion 74 which is located frontward of the first foot-placing portion 72 in the vehicle, extends in the vehicle width direction, has a plate shape, and has saw-shaped pegs 73 formed in its upper end; a third foot-placing portion 76 which is located rearward of the first foot-placing portion 72 in the vehicle, extends in the vehicle width direction, has a plate shape, and has saw-shaped pegs 75 formed in its upper end; a first reinforcement member 81 which connects the first foot-placing portion 72 and the second foot-placing portion 74; a second reinforcement member 82 which connects the first foot-placing portion 72 and the second foot-placing portion 74 at a position outward of the first reinforcement member 81 in the vehicle width direction; a third reinforcement member 83 which connects the first foot-placing portion 72 and the third foot-placing portion 76; and a fourth reinforcement member 84 which connects the first foot-placing portion 72 and the third foot-placing portion 76 at a position outward of the third reinforcement member 83 in the vehicle width direction.

The first reinforcement member 81 and the second reinforcement member 82 connect the first foot-placing portion 72 and the second foot-placing portion 74, and constitute a front portion of the step portion 62. Thus, the first reinforcement member 81 and the second reinforcement member 82 are both called as front portion reinforcement members 77. Note that, in the embodiment, the number of the front portion reinforcement members 77 is two, but may be one, three, or four, and the number thereof can be set as desired in consideration of weight, rigidity, and the like.

Furthermore, the third reinforcement member 83 and the fourth reinforcement member 84 connect the first foot-placing portion 72 and the third foot-placing portion 76, and constitute a rear portion of the step portion 62. Thus, the third reinforcement member 83 and the fourth reinforcement member 84 are both called as rear portion reinforcement members 78. Note that, in the embodiment, the number of the rear portion reinforcement members 78 is two, but may be one, three, or four, and the number thereof can be set as desired in consideration of weight, rigidity, and the like.

In a plan view of the vehicle, outer portions of the second foot-placing portion 74 and the third foot-placing portion 76 in the vehicle width direction are connected to each other with an arc-shaped plate 85 having a circular arc shape, and inner portions thereof in the vehicle width direction are connected to each other with a front-rear plate 86 which has a straight shape and to which the attachment portion 61 is attached.

The arc-shaped plate 85 is connected to one end 87 (extremity) of the first foot-placing portion, and the front-rear plate 86 is connected to the other end 88 (root) of the first foot-placing portion.

Figure 6:
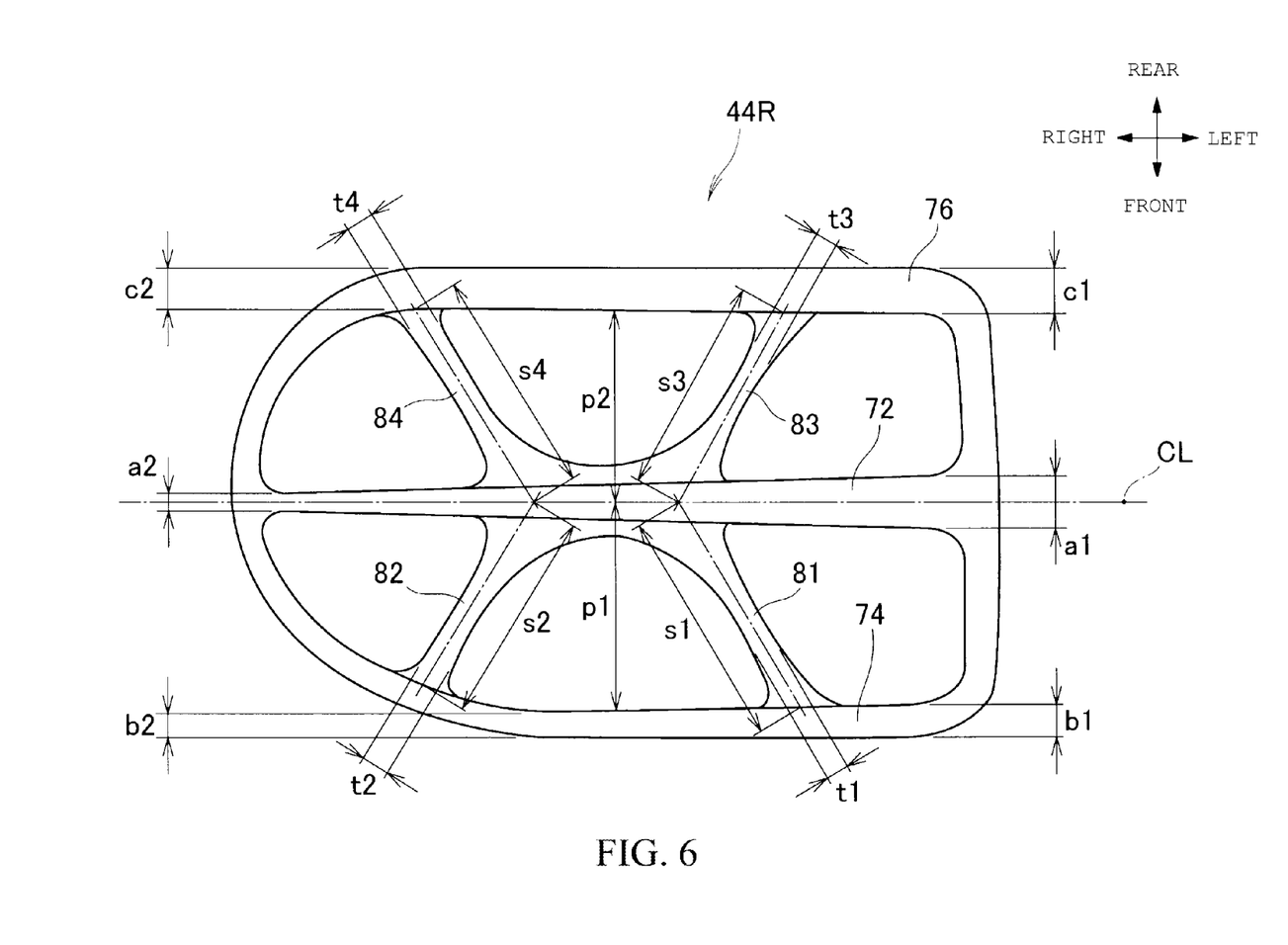
FIG. 6 is a view for explaining dimensional relationships of elements in FIG. 5.

Next, dimensional relationships of the elements constituting the step portion are described in the plan view of the vehicle.

As shown in FIG. 6, each of the plate thickness (a) of the first foot-placing portion 72, the plate thickness (b) of the second foot-placing portion 74, and the plate thickness (c) of the third foot-placing portion 76 becomes smaller toward the outer side in the vehicle width direction. Specifically, a relationship between the plate thickness ($a_1$) of a vehicle-width inner-side portion of the first foot-placing portion 72 and the plate thickness (a2) of a vehicle-width outer-side portion of the first foot-placing portion 72 is a2<a1, a relationship between the plate thickness (b1) of a vehicle-width inner-side portion of the second foot-placing portion 74 and the plate thickness (b2) of a vehicle-width outer-side portion of the second foot-placing portion 74 is b2<b1, and a relationship between the plate thickness (c1) of a vehicle-width inner-side portion the third foot-placing portion 76 and the plate thickness (c2) of a vehicle-width outer-side portion of the third foot-placing portion 76 is c2<c1.

Since each of the plate thickness (a) of the first foot-placing portion 72, the plate thickness (b) of the second foot-placing portion 74, and the plate thickness (c) of the third foot-placing portion 76 becomes smaller toward the outer side in the vehicle width direction, a root portion of the step portion 62 constituting the foot rest 44 can have sufficient rigidity while the weight of the foot rest 44 is reduced.

Moreover, the third reinforcement member 83 and the fourth reinforcement member 84 are disposed to be front-rear symmetric to the first reinforcement member 81 and the second reinforcement member 82 in the plan view of the vehicle with respect to the first foot-placing portion 72. In addition, each of the length (s1) of the first reinforcement member 81 and the length (s2) of the second reinforcement member 82 is made larger than the distance (p1) between the first foot-placing portion 72 and the second foot-placing portion 74 in a vehicle longitudinal direction. In other words, there are relationships of p1<s1 and p1<s2.

Each of the length (s3) of the third reinforcement member 83 and the length (s4) of the fourth reinforcement member 84 is made larger than the distance (p2) between the first foot-placing portion 72 and the third foot-placing portion 76 in the vehicle longitudinal direction. In other words, there are relationships of p2<s3 and p2<s4.

Furthermore, the plate thickness (t1) of the first reinforcement member 81 is set to be larger than the plate thickness (t2) of the second reinforcement member 82, and the plate thickness (t3) of the third reinforcement member 83 is set to be larger than the plate thickness (t4) of the fourth reinforcement member 84. In other words, there are relationships of t2<t1 and t4<t3.

By setting the plate thickness (t1) of the first reinforcement member 81 and the plate thickness (t3) of the third reinforcement member 83 on the step-bracket side of the step portion 62 to be larger, the rigidity of the root portion of the step portion 62 can be increased while the weight of the step portion 62 is reduced.

Figure 7:
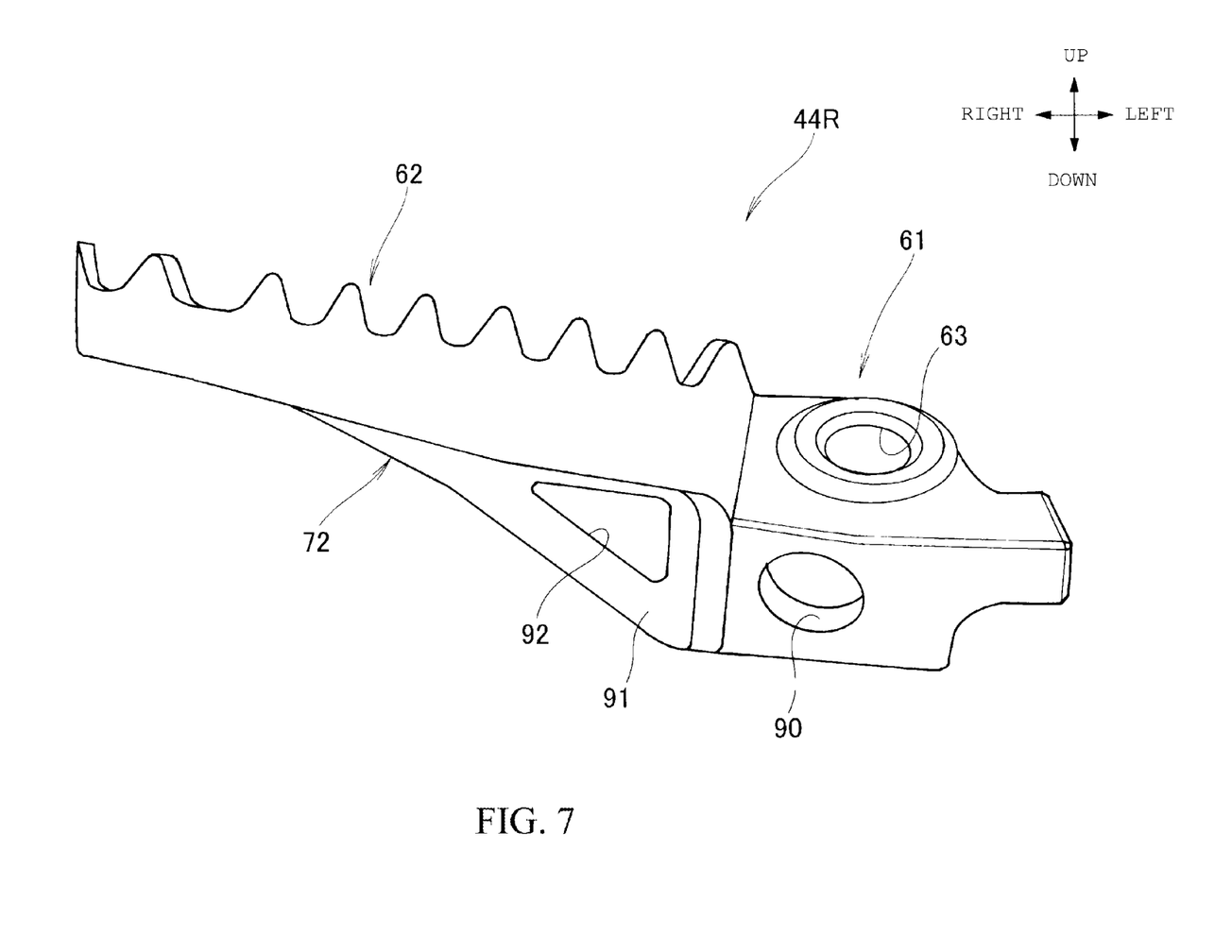
FIG. 7 is a view seen in a direction of arrow 7 in FIG. 5.

Next, the structure of the foot rest seen from the front of the vehicle is described.

As shown in FIG. 7, the foot rest 44R is formed of the attachment portion 61 supported by the step bracket 45R and the step portion 62 extended outward from the attachment portion 61 in the vehicle width direction.

A hole portion 92 having a substantially triangle shape is opened in a base portion 91 in an inner-side portion, in the vehicle width direction, of the first foot-placing portion 72 constituting the step portion 62. A mud discharging hole 90 for facilitating discharge of accumulated mud is opened in the attachment portion 61. Weight is also reduced by the mud discharging hole 90.

Figure 8:
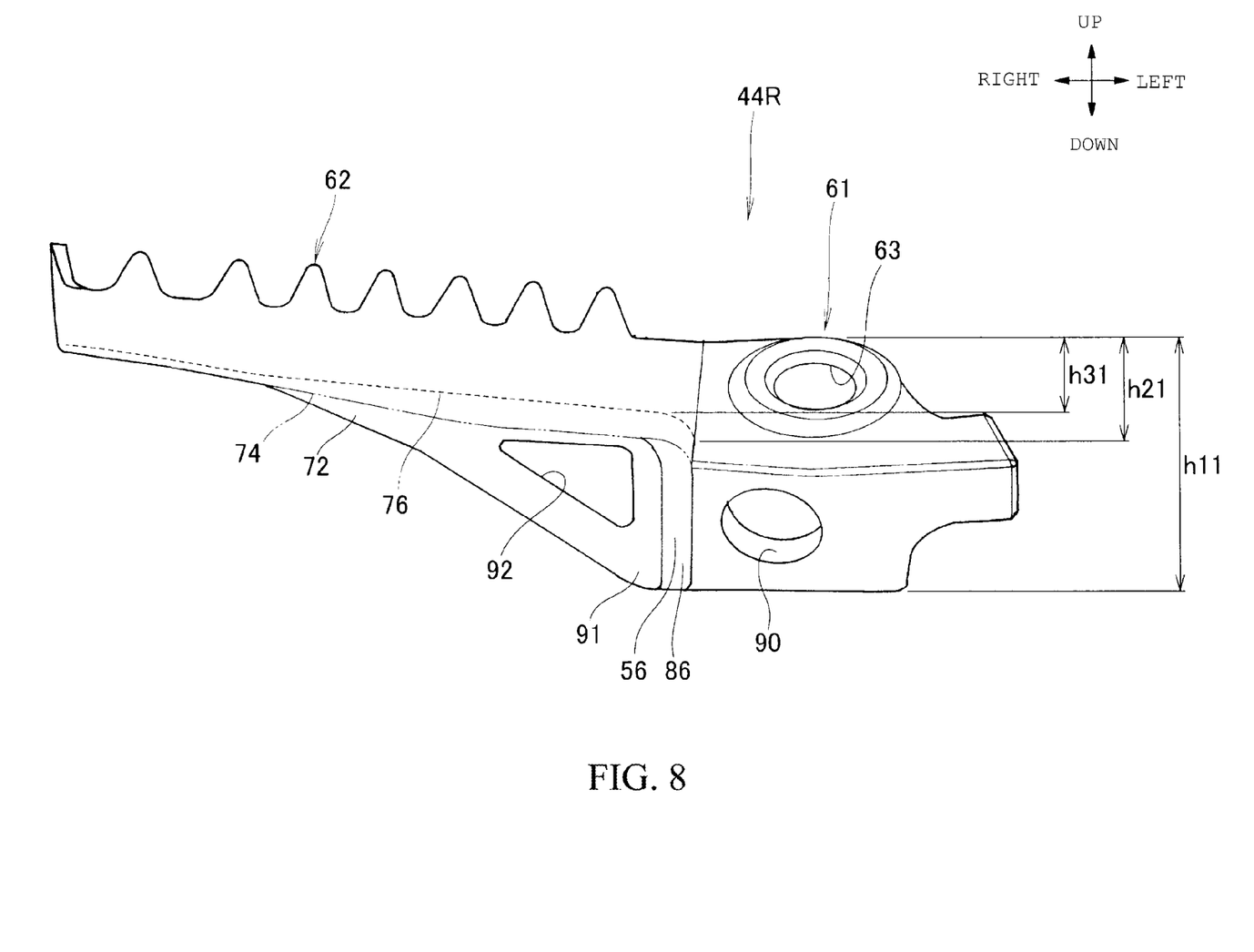
FIG. 8 is a view for explaining dimensional relationships of elements in FIG. 7.

Next, dimensional relationships of the elements constituting the step portions are described in a front view of the vehicle.

As shown in FIG. 8, each of the first foot-placing portion 72, the second foot-placing portion 74, and the third foot-placing portion 76 is formed such that the height thereof becomes smaller toward the outer side of the vehicle in the front view of the vehicle.

Moreover, in a vicinity of the connecting portion 56 where the first foot-placing portion 72 and the front-rear plate 86 are connected, the height (h11) of the first placing portion 72 formed to have such a height dimension as to extend to a lower level than the height (h21) of the second foot-placing portion 74 and the height (h31) of the third foot-placing portion 76 (h21<h11, h31<h11).

Figure 9:
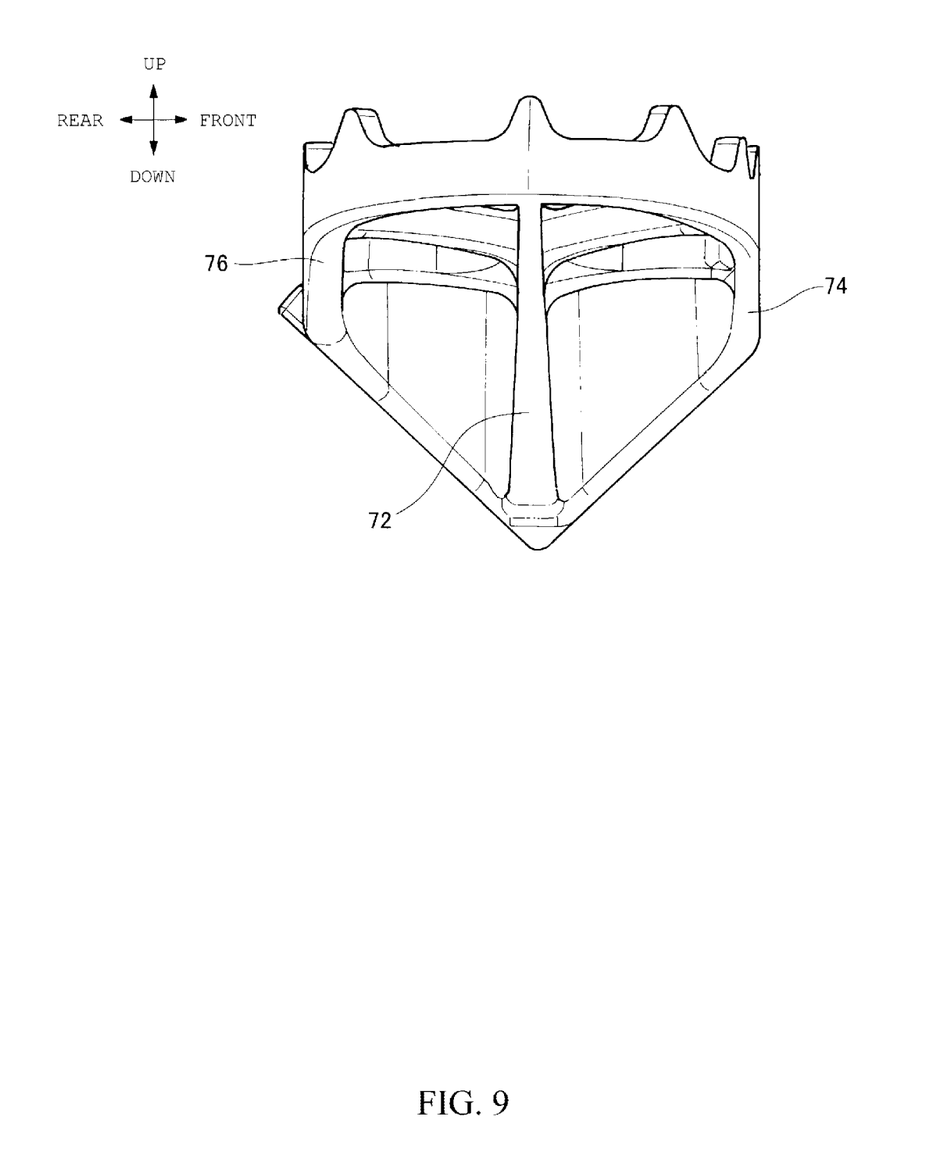
FIG. 9 is a front view (view seen from the right side of the vehicle) of the foot rest.

Next, the foot rest seen from a lateral side of the vehicle is described.

As shown in FIG. 9, the first foot-placing portion 72 is formed such that the height thereof becomes gradually larger from an outer end toward the vehicle center in the vehicle width direction and is largest at an inner end where the first foot-placing portion 72 is connected to the attachment portion 61.

Similarly, each of the second foot-placing portion 74 and the third foot-placing portion 76 is formed such that the height thereof becomes gradually larger from an outer end toward the vehicle center in the vehicle width direction and is largest at an inner end where the second foot-placing portion 74 or the third foot-placing portion 76 is connected to the attachment portion 61.

Figure 10:
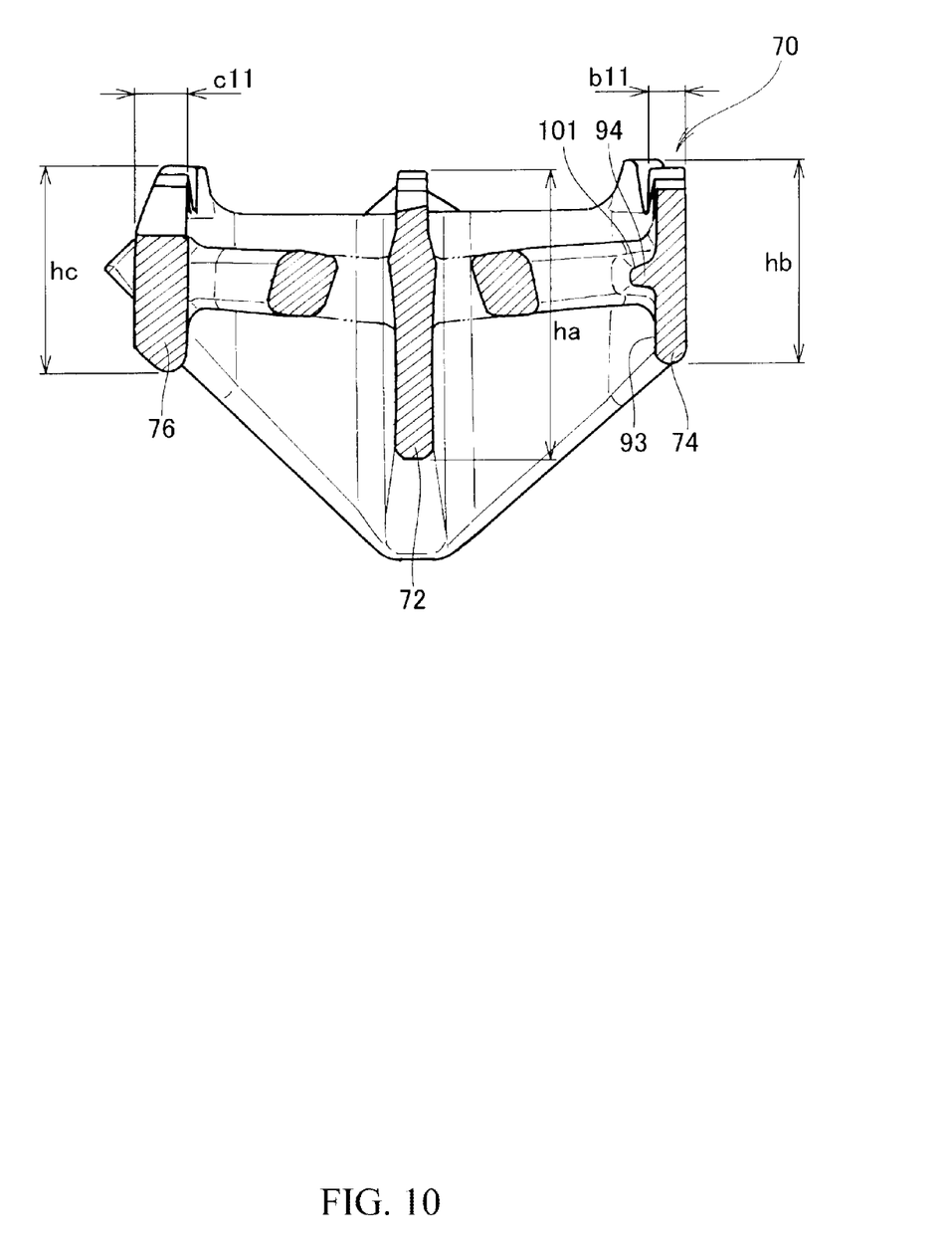
FIG. 10 is a cross-sectional view taken along the line 9-9 of FIG. 10.

Next, the structure of the step portion is described using a cross section passing through the first foot-placing portion, the second foot-placing portion, and the third foot-placing portion.

As shown in FIG. 10, the height (ha) of the first foot-placing portion 72 is larger than the height (hb) of the second foot-placing portion 74 (hb<ha), and the height (ha) of the first foot-placing portion 72 is larger than the height (hc) of the third foot-placing portion 76 (hc<ha).

Moreover, the thickness (c11) of the third foot-placing portion 76 is set to be larger than the thickness (b11) of the second foot-placing portion 74 (b11<c11).

Furthermore, a reinforcement rib 94 extends toward the first foot-placing portion 72 from an inner-side surface 93 of the second foot-placing portion 74. The reinforcement rib 94 is described below in detail.

Returning to FIG. 5, on the inner-side surface 93 of the second foot-placing portion 74 and an inner-side surface 95 of the third foot-placing portion 76, the reinforcement rib 94 is formed from the second foot-placing portion 74 to the fourth reinforcement member 84 extending to the third foot-placing portion 76 while passing through a connection portion 96 with the first reinforcement member 81, a connection portion 97 with the second reinforcement member 82, and a connection portion 98 with the fourth reinforcement member 84.

On the inner-side surface 93 of the second foot-placing portion 74 and the inner-side surface 95 of the third foot-placing portion 76, the reinforcement rib 94 is formed from the second foot-placing portion 74 to the third foot-placing portion 76, up to a portion of the fourth reinforcement member 84 extending to the third foot-placing portion 76. Such reinforcement rib 94 allows the rigidities of the second foot-placing portion 74 and the third foot-placing portion 76 to be maintained at a high level while allowing the plate thicknesses to be reduced to achieve weight reduction.

Returning to FIG. 10, an upper surface of the reinforcement rib 94 is an inclined surface 101 inclined with respect to the horizontal plane. Such inclined surface 101 allows mud attached to foot-placing portions 70 less likely to stay on the foot-placing portions 70.

Referring to FIGS. 2, 5, and 6, the plate thickness (c1) of the third foot-placing portion 76 is made larger than the plate thickness (b1) of the second foot-placing portion 74 (b1<c1). When the rider kicks the kick pedal 29, the kick pedal 29 is brought into contact with a vicinity of the third foot-placing portion 76 of the step portion and the vicinity of the third foot-placing portion 76 serves as a stopper.

In the present disclosure, the plate thickness (c1) of the third foot-placing portion 76 is made larger than the plate thickness (b1) of the second foot-placing portion 74. Thus, the rigidity of the third foot-placing portion 76 is increased and the effect when the kick pedal 29 is brought into contact with the foot-placing portion 70 is suppressed.

Moreover, a connection portion 99 where the third reinforcement member 83 is connected to the third foot-placing portion 76 and the connection portion 98 where the fourth reinforcement member 84 is connected to the third foot-placing portion 76 are disposed close to the moving path of the kick pedal 29 for starting the engine 23 suspended in the saddle-ride type vehicle.

When the rider kicks the kick pedal 29, the kick pedal 29 is brought into contact with the connection portion 99 of the third foot-placing portion 76 and the third reinforcement member 83. At this time, the connection portion 99 is in contact with the kick pedal 29, and serves as a stopper.

In the present disclosure, the plate thickness of the third foot-placing portion 76 is made larger, and the connection portion 99 of the third foot-placing portion 76 and the third reinforcement member 83 is disposed close to the moving path of the kick pedal 29. By disposing the connection portion 99 at such a position, the rigidity of the third foot-placing portion 76 is increased and the effect when the kick pedal 29 is brought into contact with the foot-placing portion 70 is suppressed.

Figure 11:
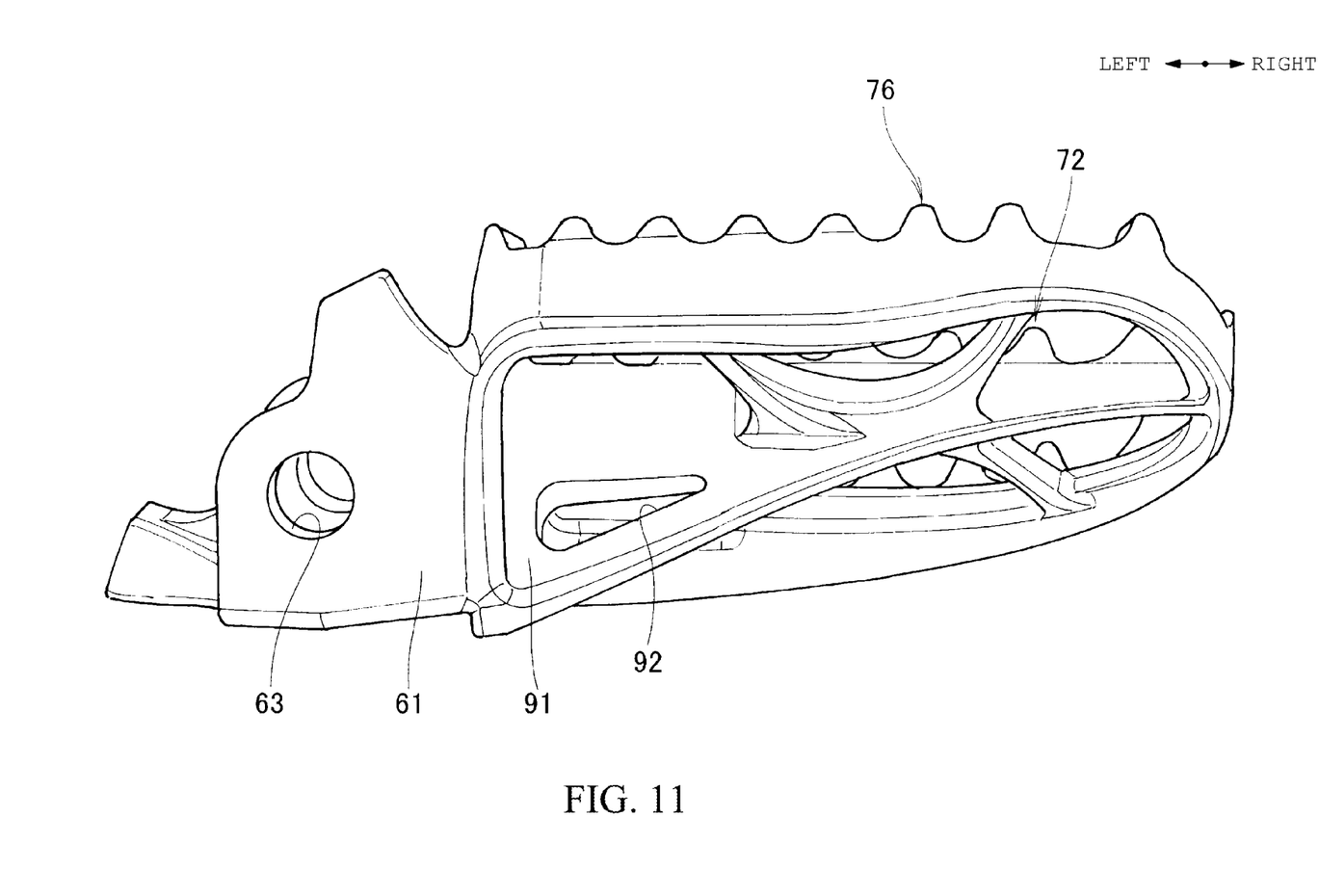
FIG. 11 is a perspective view of the foot rest seen from a lower-rear side.

As shown in FIG. 11, the hole portion 92 is opened in the base portion of the first foot-placing portion 72, which is on the inner side in the vehicle width direction. By opening the hole portion 92 in the base of the first foot-placing portion 72, the base portion 91 of the first foot-placing portion 72 can be made flexible and easier to deflect. By making the base portion 91 of the first foot-placing portion easier to deflect, a force applied to the attachment portion 61 can be distributed.

Effects of the foot rest of the saddle-ride type vehicle described above are described below.

Returning to FIG. 5, the first reinforcement member 81 to the fourth reinforcement members 84 are disposed to be front-rear symmetric to each other in the plan view of the vehicle with respect to the first foot-placing portion 72. In addition, each of the first reinforcement member 81 to the fourth reinforcement member 84 is formed such that the length thereof is larger than the distance from the first foot-placing portion 72 to the second foot-placing portion 74 in the vehicle longitudinal direction and the distance from the first foot-placing portion 72 to the third foot-placing portion 76 in the vehicle longitudinal direction.

Depending on the riding posture of the rider, a stepping force in the vehicle width direction is sometimes applied only to the second foot-placing portion 74 or the third foot-placing portion 76.

Conventionally, in a case where reinforcement members are provided in a step portion provided with first to third foot-placing portions extending in the vehicle width direction, first to fourth reinforcement members extend in the vehicle longitudinal direction from the first foot-placing portion. The first to fourth reinforcement members are arranged to form cross shaped with the first foot-placing portion.

When the stepping force in the vehicle width direction is applied only to the second foot-placing portion 74 in the foot rest with the cross shapes, the second foot-placing portion 74 may be shifted in the vehicle width direction with respect to the first foot-placing portion 72. To counter this, the first and the second reinforcement members 81, 82 require to be made thicker. This also applies to the third foot-placing portion 76, and thus the weight of the first to fourth reinforcement members 81 to 84 is increased.

In the present disclosure, the first to fourth reinforcement members 81 to 84 are arranged in an X-shape. Thus, the rigidity against an external force in the vehicle width direction is increased, and the first to fourth reinforcement members 81 to 84 can be made thinner.

As a result, rigidity of the step portion 62 can be secured and weight thereof is reduced in a good balance.

Moreover, making the first to fourth reinforcement members 81 to 84 thin increases an opening area in the plan view. Since the area of multiple opening portions 102 formed between the foot-placing portions 70 and the reinforcement members 81 to 84 is increased, mud attached to the foot-placing portions 70 can be immediately discharged.

The outer portions of the second foot-placing portion 74 and the third foot-placing portion 76 in the vehicle width direction are connected to each other with the arc-shaped plate 85. Since the outer end of the step portion 62 is formed of the arc-shaped plate 85, the area of the step portion 62 can be increased compared to a case where the outer end is formed of a straight-shaped plate. Increasing the area of the step portion 62 improves the operability of the vehicle.

An outer frame 104 of the step portion is formed of the second foot-placing portion 74, the arc-shaped plate 85, the third foot-placing portion 76, and the front-rear plate 86. The first foot-placing portion 72 and the first reinforcement member 81 to the fourth reinforcement member 84 are attached in a leaf-vein shape in a portion surrounded by the outer frame 104.

Since the outer frame 104 is reinforced by the first foot-placing portion 72 and the first reinforcement member 81 to the fourth reinforcement member 84 in the leaf-vein shape, sufficient rigidity is secured. Thus, the outer frame 104 can withstand an impact from the surroundings to the foot-placing portions 70.

Returning to FIG. 8, each of the first foot-placing portion 72, the second foot-placing portion 74, and the third foot-placing portion 76 is formed such that the height thereof becomes smaller toward the outer side of the vehicle in the front view of the vehicle.

Since the second foot-placing portion 74 and the third foot-placing portion 76 are made smaller than the first foot-placing portion 72, the step portion 62 is reduced in weight. In addition, the first foot-placing portion 72 is formed to have such a height dimension as to extend to a lower level than the second foot-placing portion 74 and the height of the third foot-placing portion 76. Thus, the rigidity against an impact in a height direction is secured.

Figure 12:
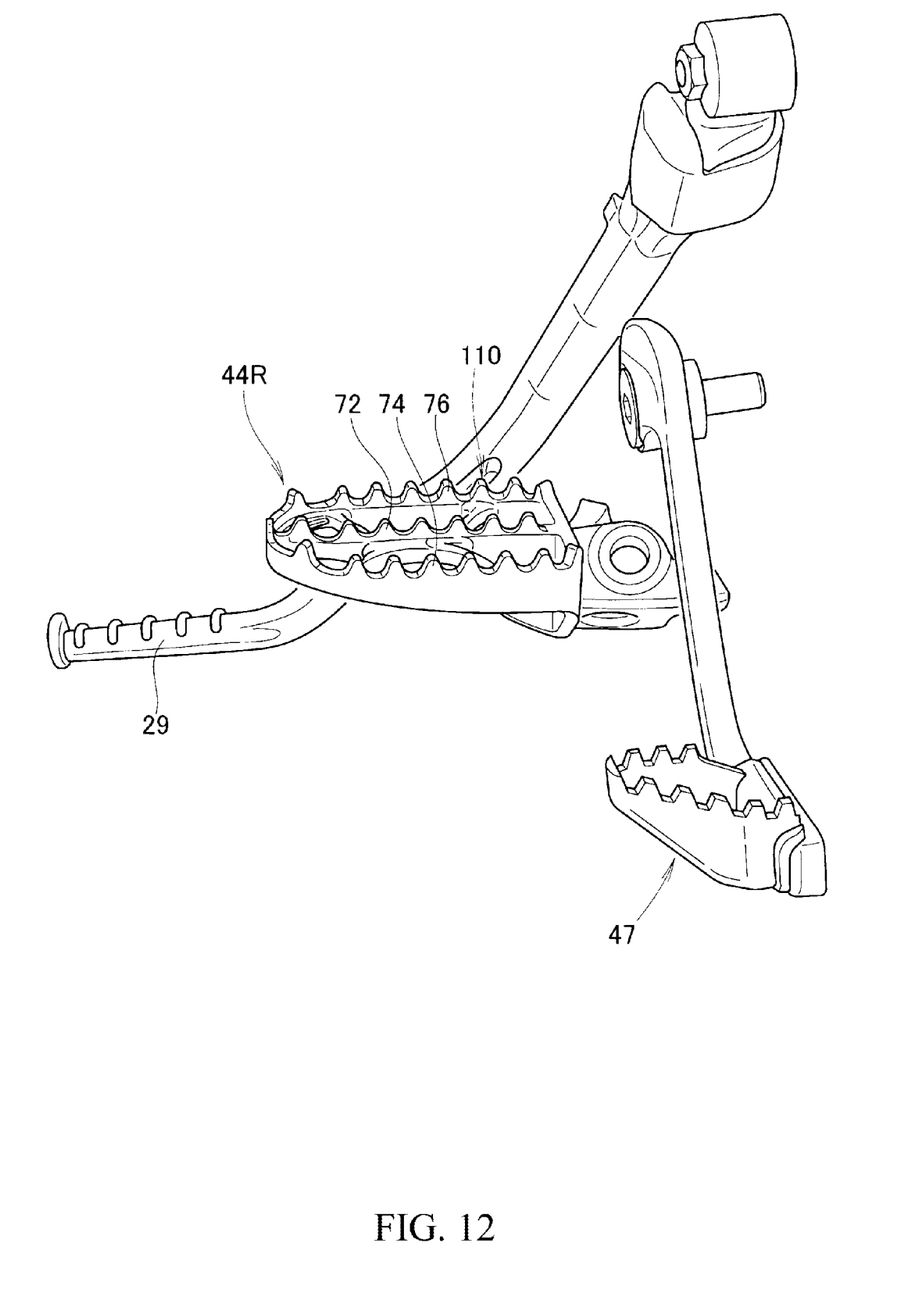
FIG. 12 is an operation view explaining that a step portion for placing the foot serves as a stopper of a kick pedal.

As shown in FIG. 12, when the kick pedal 29 is kicked down, the kick pedal 29 is brought into contact with the foot rest 44R serving as a stopper.

Referring to FIG. 1 also, the third foot-placing portion 76 serves also as the stopper of the kick pedal 29. Since the connection portion 99 where the third reinforcement member 83 as a component of the rear portion reinforcement member 78 is connected to the third foot-placing portion 76 is located at the contact portion 110 of the third foot-placing portion 76 with the kick pedal 29, when a rider kicks the kick pedal 29, the kick pedal 29 is brought into contact with the contact portion 110, and the third foot-placing portion 76 serves as the stopper.

The plate thickness of the third foot-placing portion 76 is set to be larger than the plate thickness of the first foot-placing portion 72 and the second foot-placing portion 74. When a rider kicks the kick pedal 29, the kick pedal 29 is brought into contact with the third foot-placing portion 76 of the step portion, and the third foot-placing portion 76 serves as the stopper. In the present disclosure, since the plate thickness of the third foot-placing portion 76 is larger than the first foot-placing portion 72, the rigidity of the third foot-placing portion 76 is increased and the kick pedal 29 can be surely stopped.

Note that, although applied to a motorcycle in the embodiment, the present disclosure can be applied also to a tricycle. There is no problem in applying the present disclosure to any general saddle-ride type vehicle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A foot rest for a saddle-ride type vehicle including a step portion for placing a foot and an attachment portion which extends from the step portion toward a vehicle body frame and is turnably attached to a step bracket on the vehicle-body-frame side, the step portion comprising:

a first foot-placing portion which extends in a vehicle width direction, has a plate shape, and has saw-shaped pegs formed on an upper end thereof;

a second foot-placing portion which is located frontward of the first foot-placing portion in the vehicle, extends in the vehicle width direction, has a plate shape, and has saw-shaped pegs formed on an upper end thereof;

a third foot-placing portion which is located rearward of the first foot-placing portion in the vehicle, extends in the vehicle width direction, has a plate shape, and has saw-shaped pegs formed on an upper end thereof;

at least one or more front portion reinforcement members connecting the first foot-placing portion and the second foot-placing portion; and at least one or more rear portion reinforcement members connecting the first foot-placing portion and the third foot-placing portion, a connection portion where at least one of the rear portion reinforcement members is connected to the third foot-placing portion is located at a portion of the third foot-placing portion, which comes into contact with the kick pedal, and wherein the third foot-placing portion is formed to be thicker than the first foot-placing portion.

2. The foot rest for a saddle-ride type vehicle according to claim 1, wherein the front portion reinforcement members connecting the first foot-placing portion and the second foot-placing portion include a first reinforcement member and a second reinforcement member connecting the first foot-placing portion and the second foot-placing portion at a position outward of the first reinforcement member in the vehicle width direction, the rear portion reinforcement members include a third reinforcement member connecting the first foot-placing portion and the third foot-placing portion and a fourth reinforcement member connecting the first foot-placing portion and the third foot-placing portion at a position outward of the third reinforcement member in the vehicle width direction, the third reinforcement member and the fourth reinforcement member are disposed to have front-to-rear symmetry to the first reinforcement member and the second reinforcement member in a plan view of the vehicle with respect to the first foot-placing portion, the first reinforcement member and the second reinforcement member are each formed to have a length larger than a distance between the first foot-placing portion and the second foot-placing portion in a vehicle longitudinal direction, the third reinforcement member and the fourth reinforcement member are each formed to have a length larger than a distance between the first foot-placing portion and the third foot-placing portion in the vehicle longitudinal direction.

3. The foot rest for a saddle-ride type vehicle according to claim 1, wherein outer portions of the second foot-placing portion and the third foot-placing portion in the vehicle width direction, in a plan view of the vehicle, are connected to each other with an arc-shaped plate having a substantially circular arc shape, and inner portions thereof in the vehicle width direction are connected to each other with a front-rear plate which has a straight shape or an arc shape and to which the attachment portion is attached, and the arc-shaped plate and the front-rear plate are connected to one end and the other end of the first foot-placing portion, respectively.

4. The foot rest for a saddle-ride type vehicle according to claim 1, wherein each of the first foot-placing portion, the second foot-placing portion, and the third foot-placing portion is formed such that a height thereof becomes smaller toward an outer side of the vehicle in a front view of the vehicle, and in a vicinity of a connection portion where the first foot-placing portion and a front-rear plate are connected, the first foot-placing portion is formed to have a height dimension so as to extend to a lower level with respect to the second foot-placing portion and the third foot-placing portion.

5. The foot rest for a saddle-ride type vehicle according to claim 1, wherein a hole portion is opened in a base portion of the first foot-placing portion on an inner side in the vehicle width direction.

6. The foot rest for a saddle-ride type vehicle according to claim 1, wherein a plate thickness of each of the first foot-placing portion, the second foot-placing portion, and the third foot-placing portion becomes thinner toward an outer side in the vehicle width direction.

7. The foot rest for a saddle-ride type vehicle according to claim 1, wherein, on inner-side surfaces of the second foot-placing portion and the third foot-placing portion, a reinforcement rib is formed extending from the second foot-placing portion to the fourth reinforcement member and further extending to the third foot-placing portion such that the reinforcement rib passes through a connection portion with the first reinforcement member, a connection portion with the second reinforcement member, and a connection portion with the fourth reinforcement member.

8. The foot rest for a saddle-ride type vehicle according to claim 7, wherein an upper surface of the reinforcement rib has an inclined surface, wherein said surface is inclined with respect to a horizontal plane.

9. The foot rest for a saddle-ride type vehicle according to claim 1, wherein plate thicknesses of the first reinforcement member and the third reinforcement member are set to be larger than plate thicknesses of the second reinforcement member and the fourth reinforcement member, respectively.

* * * * *